United States Patent [19]
Leeson

[11] Patent Number: 5,285,626
[45] Date of Patent: Feb. 15, 1994

[54] DRIVE FOR MAIN ENGINE AUXILIARIES FOR AN AIRCRAFT GAS TURBINE ENGINE

[75] Inventor: Plato J. Leeson, Rockford, Ill.

[73] Assignee: Woodward Governor Company, Rockford, Ill.

[21] Appl. No.: 898,136

[22] Filed: Jun. 15, 1992

Related U.S. Application Data

[63] Continuation-in-part of Ser. No. 855,178, Mar. 20, 1992, abandoned.

[51] Int. Cl.⁵ .............................................. F02C 6/08
[52] U.S. Cl. .................................. 60/39.02; 60/39.07; 60/39.183
[58] Field of Search ............... 60/39.02, 39.07, 39.148, 60/39.15, 39.183, 39.281, 727, 734

[56] References Cited

U.S. PATENT DOCUMENTS

| | | |
|---|---|---|
| 2,612,020 | 9/1952 | Griffith . |
| 2,692,476 | 10/1954 | Schaal et al. . |
| 2,767,562 | 10/1956 | Hall ..................................... 60/39.07 |
| 2,933,887 | 4/1960 | Davies ............................. 60/39.281 |
| 2,946,190 | 7/1960 | Corbett ........................... 60/39.281 |
| 2,949,731 | 8/1960 | Hambling . |
| 3,332,234 | 7/1967 | Lavash ............................. 60/39.281 |
| 3,442,218 | 5/1969 | Wess ................................. 60/39.281 |
| 3,475,910 | 11/1969 | Warne .............................. 60/39.281 |
| 4,400,934 | 8/1983 | Oberlander . |
| 5,143,329 | 9/1992 | Coffinberry . |

Primary Examiner—Louis J. Casaregola
Attorney, Agent, or Firm—Leydig, Voit & Mayer

[57] ABSTRACT

A drive system for auxiliaries associated with a main gas turbine engine. The system includes auxiliary turbines for pneumatically driving the auxiliaries which are in turn divided into groups. A high pressure supply is tapped from the main engine or starter system and fed to the intakes of the respective auxiliary turbines. Controllers are associated with each of the auxiliary turbines to independently control the speeds of those turbines. Thus, the auxiliaries can be segregated between a group which is essential for starting the main engine, and a non-essential group. The former group is driven during starting while the latter group remains quiescent. Alternatively, the auxiliaries can be divided into one group mechanically coupled to the main engine and at least one other group driven by at least one auxiliary turbine.

25 Claims, 2 Drawing Sheets

DRIVE FOR MAIN ENGINE AUXILIARIES FOR AN AIRCRAFT GAS TURBINE ENGINE

CROSS REFERENCE TO RELATED APPLICATION

This is a continuation-in-part of application Ser. No. 07/855,178, filed Mar. 20, 1992 (abandoned).

FIELD OF THE INVENTION

This invention relates to gas turbine engines, and more particularly to a drive for the auxiliaries which are associated with such engines.

BACKGROUND OF THE INVENTION

Aircraft gas turbine engines (as well as gas turbine engines for other applications) require auxiliary devices for their operation. Typical auxiliary devices include fuel pumps (oftentimes boost pumps and main pumps), hydraulic or lubrication pumps, electrical alternators or generators (which can include the FADEC [full authority digital electronic control] power source) standby generators, pumps and the like, and other such devices. It has been typical to provide a power takeoff shaft from the main engine to an auxiliary gearbox, and to drive all of the auxiliary units from the gearbox. This usually provides a very reliable system, but one which is not without its drawbacks.

One of the drawbacks is the fact that the auxiliaries are fixedly geared to the engine (and thus to each other) which requires (a) that all or most of the auxiliaries be driven when starting the engine, and (b) that the speed range of the auxiliary be rather extreme so they can produce useful output at starting rpm and rated output at a much higher running rpm.

With respect to engine starting, the auxiliaries for a commercial jet turbine engine often require hundreds of horsepower, and all of that machinery must be rotated by the equipment which is used to start the gas turbine engine. The demands on the power needed to direct the starter are obvious. More importantly is the occasional necessity to start the engine in an emergency situation (such as a windmill start after a flameout), and the added horsepower requirements for rotating the auxiliaries make the starting problem more difficult.

With respect to the operating range of the auxiliaries, those which are critical to engine starting, such as the fuel pump, and the FADEC alternator, must produce rated output at low starting rpm's in order to start and control the engine. For example, with respect to the FADEC alternator, only 8% of maximum rpm must produce enough power to keep the FADEC functional. That requirement results in a rather large and complex alternator which, at running rpm, produces far more power than is needed by the FADEC.

Similarly, with respect to the fuel pump, it must have the capacity to produce an adequate flow rate at starting rpm (again, 8% to 10% of maximum rpm) to start the engine. Thus, when cruising at altitude, the flow rate from the fuel pump is so high as to require a substantial bypass flow which is undesirable in that it consumes excess horsepower and uses that excess horsepower simply to heat the fuel. While the fuel can act as a heat sink in aircraft, the heat sink capacity of the fuel is limited particularly at altitude. Thus, the excess capacity of the fuel pump is more than wasteful, it sometimes heats the fuel beyond an upper desired temperature.

One further problem which results from utilizing the conventional mechanical drive for driving the auxiliaries is the fact that the auxiliaries must all be located on or very near the gearbox and that can adversely impact the aerodynamics of the engine envelope for aircraft.

It has been proposed to eliminate the power takeoff shaft and auxiliary gearbox, and replace them with a pneumatic takeoff from the main engine compressor which drives an auxiliary turbine which in turn drives all of the accessories. Griffith U.S. Pat. No. 2,612,020 describes such a system. The system proposed in that patent has the capability of alleviating the engine envelope problem in that greater flexibility for the placement of the auxiliaries can be provided. However, in the system described in that patent, all of the auxiliaries are driven from the auxiliary turbine, and the auxiliary turbine has a regulated speed, such that when the engine is running, the effect is not unlike the mechanically coupled auxiliaries of the conventional approach. All of the auxiliaries are operating at a fixed speed with respect to each other and to the engine. Furthermore, since some of the auxiliaries must be operated in order to start the engine, not only will all of the auxiliaries be operated, but all will be operated in the same speed ratios, whether or not they are needed in the starting operation. That produces an unnecessary load on the starting system much as is done with the conventional mechanically coupled auxiliary system.

SUMMARY OF THE INVENTION

In view of the foregoing, it is a general aim of the present invention to provide a drive system for gas turbine auxiliaries which is more flexible and adaptable than those available heretofore in providing independent on/off or speed control of the auxiliaries with respect to each other and to the engine.

In accomplishing that aim, it is an object of the present invention to provide a drive system for gas turbine engine auxiliaries which decouples the auxiliaries from the engine and from each other to allow the speed ratios to be adjusted to meet various operating conditions.

A further object is to provide an auxiliary drive system for a gas turbine engine which is highly reliable and therefore adapted to replace the more cumbersome mechanical drive of the conventional prior art.

An object according to the present invention is to provide independently speed controllable turbines for driving groups of auxiliaries for a gas turbine engine so that the drives of the groups can be independently controlled to meet a variety of operating conditions.

According to one aspect of the invention, it is an object to enhance the ability to start a main engine by providing separate independent turbine drives for groups of auxiliaries, one of which is essential to starting and the other which is not, and to power only the former.

In its broad aspects, an object of the present invention is to divide the auxiliaries into two groups which are decoupled from each other so that the drive ratios between the two groups can be varied.

It is a feature of the invention that multiple auxiliary turbines are used to drive separate groups of auxiliaries, and that the drives are independently controlled so that the speed ratios of the groups with respect to each other and with respect to the engine are readily alterable.

It is a resulting feature that the auxiliaries themselves need not have as wide a speed operating range as those used heretofore. The auxiliaries can be driven by means of the auxiliary turbines at a much higher speed at starting than was available in the past, and the gear ratio with respect to the engine effectively changed after the engine starts. The changing of the gear ratio is easily accomplished by means of a regulating valve supplying the high pressure gas to the auxiliary turbines.

A further feature of the invention is the ability to decouple auxiliaries which are not needed for the starting operation during engine starting, the decoupling of such unnecessary components reducing the power requirements for starting the engine.

Another feature of the invention is the ability to decouple at least some of the auxiliaries from the engine so that the drive ratio between the decoupled auxiliaries can be varied relative to any auxiliaries still remaining geared to the engine.

Other objects and advantages will become apparent from the following detailed description when taken in conjunction with the drawings, in which:

DETAILED DESCRIPTION OF THE PREFERRED EMBODIMENTS

While the invention will be described in connection with a preferred embodiment, there is no intent to limit it to that embodiment. On the contrary, the intent is to cover all alternatives, modifications and equivalents included within the spirit and scope of the invention as defined by the appended claims.

Figure 1:
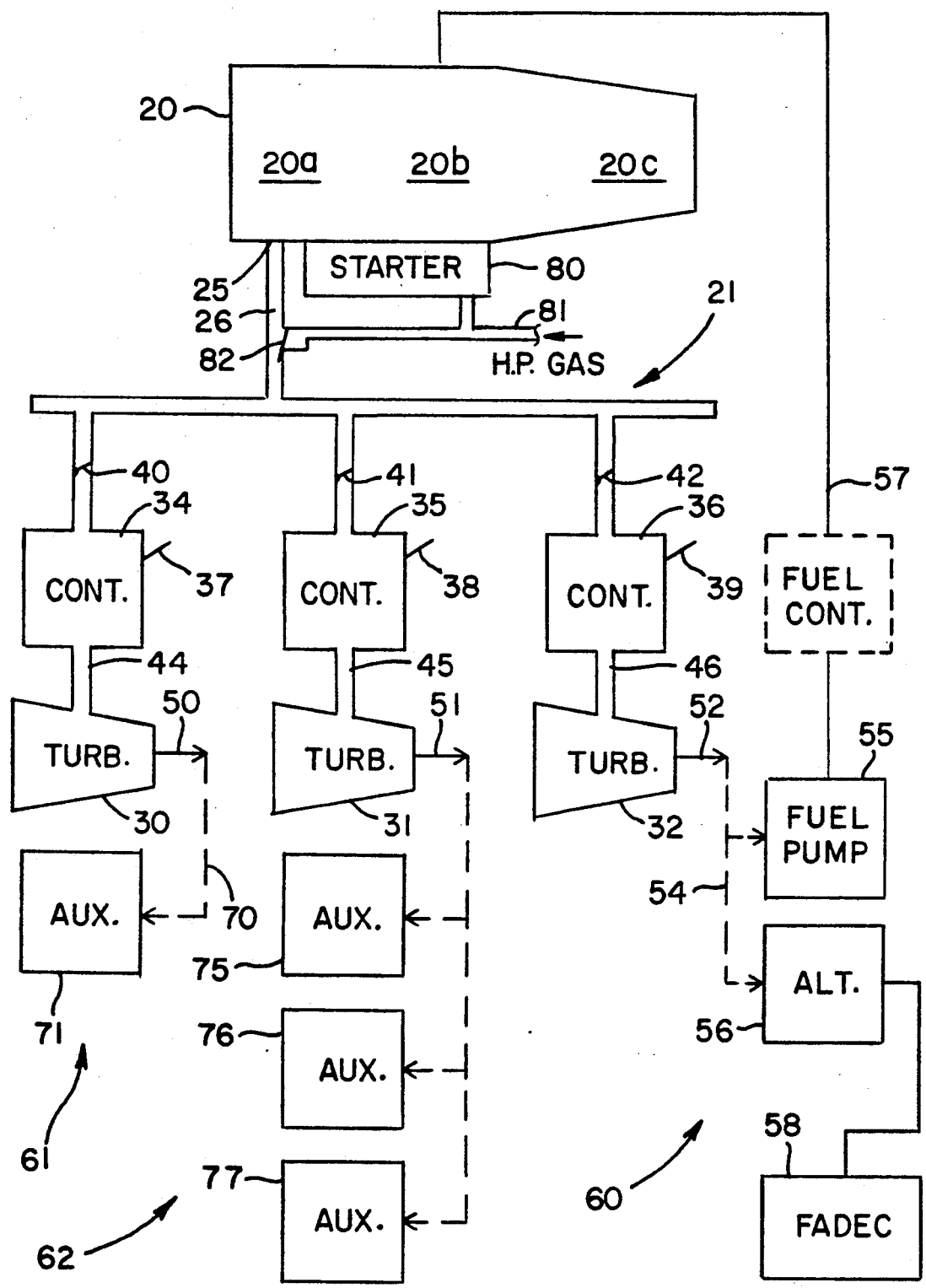
FIG. 1 illustrates a system exemplifying a preferred embodiment of the present invention, with all auxiliaries driven by auxiliary turbines.

Turning now to the drawings, FIG. 1 illustrates a gas turbine engine 20 and a drive system 21 for a plurality of auxiliary devices associated with the engine 20. FIG. 1 is schematic in nature, and the mechanical details of the elements are not illustrated. The manner of selecting and configuring particular components for practice of the invention will, however, become apparent upon reading of the instant specification in light of the drawing.

In its most common configuration, the engine 20 is typically a turbojet engine, but the invention is also applicable to turbo prop engines and the like. The engine can be the sole engine on a single engine aircraft, or the engine 20 can represent one of the engines on a multiple engine commercial craft in which case the system of the figures is replicated for each engine. The invention achieves its maximum advantages in application to aircraft, both high performance aircraft of the military type, as well as to large commercial aircraft; however, many of the advantages of the invention are achieved in other applications, including other vehicular implementations as well as stationary systems.

As is well known, the engine 20 has three primary sections, including a compressor section 20a at the forward end, an intermediate combustor section 20b, and a high pressure turbine section 20c. The compressor compresses inlet air and feeds it to the combustor 20b along with fuel from a fuel pump. The fuel is burned in the combustor, creating high pressure gas which drives the high pressure turbine 20c. The turbine 20c in turn provides power for driving the compressor 20a which is on the same shaft.

In practicing the invention, the engine provides a source of high pressure gas for driving auxiliary turbines. The high pressure gas supply can be tapped from various portions of the engine (e.g., the engine exhaust), but it is preferred to use a high pressure bleed 25 coupled, for example, to the compressor section 20a of the engine 20. The source of high pressure gas is used to drive auxiliary turbines which in turn drive the auxiliary units associated with the engine 20. Thus, where in the prior art it was necessary to provide a drive shaft geared to the main shaft which couples the compressor 20a and the turbine 20c, in the preferred embodiment of the present invention, no such shaft is required, and it is simply necessary to extract the quantity of high pressure compressed air from the engine 20 for driving separate prime movers such as auxiliary turbines. A conduit 26 conveys the high pressure air to the auxiliary drive system 21. The length of the conduit in the FIG. is simply intended to illustrate that the auxiliary units can be located somewhat distantly, for that matter, from the engine 20 (or on the engine, if that is desired), but the system provides a degree of flexibility in positioning of the auxiliary units.

In accordance with the preferred embodiment, a plurality of prime movers, illustrated as auxiliary turbines are provided for driving groups of auxiliary units. Thus, in FIG. 1, there are provided three auxiliary turbines 30, 31, 32, each having an independent source of high pressure gas separately controlled by means of an associated controller. In FIG. 1, the controllers are illustrated as blocks 34, 35, 36, it being understood that the controllers simply meter the air from the common high pressure conduit source 26 to the respective turbines 30–32.

For the sake of high reliability, it is preferred that the controllers 34–36 be configured as simple and highly reliable regulator valves which meter the high pressure air to the associated auxiliary turbine. These regulating valves are therefore capable of controlling the speed of rotation of the associated turbines 30–32 and indeed can control whether those turbines are turned on or off. Thus, it is preferred to utilize simple regulator valves for the control of the associated turbines and indeed to configure those valves such that if a failure occurs, the valve will tend to fail with the associated turbine being driven at a preset speed until the failure can be corrected.

FIG. 1 shows mechanical linkages 37, 38, 39 associated with the controllers 34–36 to illustrate that the system can provide means for adjusting the speed of the respective turbines, one with respect to the other, and with respect to the main engine 20 so that the system can better accommodate various aircraft operating conditions.

In some cases, it may be desirable to set the speed of the auxiliary turbines 30–32 to a fixed level when they are operating and simply to provide on/off valves 40–42 illustrated as positioned in the inlet conduit to the controller. Thus, the controllers 34–36 may govern the same or different speeds of operation of the respective turbines, and the valves 40–42 being in the nature of simple on/off devices which provide for one of two conditions of the associated turbine—either on at the preset speed, or off.

It is sometimes preferable for the turbines 30-32 to be identical units capable of operating at the same speed, and in other cases when the groups of auxiliary devices associated with the respective turbines have different characteristics, to provide auxiliary turbines which have different operating speeds. Both of those possibilities, as well as others which will now occur to those skilled in the art, are intended to be within the scope of the invention.

Indeed, in some cases it may be desirable to take bleed air from different parts of the high pressure compressor to supply completely separate conduits for the respective auxiliary turbines. The main feature of interest, insofar as the invention is concerned, is the fact that a plurality of auxiliary turbines are provided, driving respective members of the groups of auxiliary devices so as to provide flexibility in driving the auxiliaries rather than the fixed and unchangeable ratios which have been provided in the past by mechanical gearing or single turbine driving.

To summarize thus far, it is seen that the engine 20 has a high pressure bleed 25 at the compressor section 20a and a conduit 26 coupling that high pressure bleed to the auxiliary drive unit. Individual controllers 34-36 control the on or off condition and/or operating speed of associated auxiliary turbines 30-32 by way of regulating the high pressure gas originating from the compressor 20a and coupled to the turbine via respective conduits 44-46. Linkages 37-39 illustrate that the controllers 34-36 can be configured for adjustable speed, if desired, and on/off valves 40-42 illustrate that the controllers can be configured as simple on/off devices. Alternatively, both provisions can be provided in an appropriate case. Thus, with the engine 20 running, there is a source of high pressure gas in the conduit 26 which is supplied via the associated controllers 34-36 to the associated auxiliary turbines 30-32, causing those turbines to be driven.

Each of the turbines has an output shaft 50, 51, 52 and coupled to the output shaft by means of mechanical gearing or the like are one or more auxiliary devices. In accordance with the invention, the auxiliary devices are grouped, and one or more auxiliary devices are coupled to the output shaft of the associated auxiliary turbine. While the auxiliary turbines can be provided to drive auxiliary devices on a one-to-one basis, it is preferred to group the auxiliary devices to minimize the number of auxiliary turbines, controllers and associated piping which is required.

In one embodiment of the invention, only two groups are provided, a first group comprising those auxiliaries which are considered essential for starting the engine, and a second group comprising those which are considered to be non-essential. FIG. 1 illustrates a somewhat more complex system in which the auxiliaries are divided into three groups.

The group 60 is illustrative of the auxiliary devices considered essential to the starting of the engine. It is seen that coupled to the output shaft 52 is a gearing arrangement schematically illustrated at 54 which provides rotational drive to a first auxiliary unit 55 representative of a fuel pump and a second auxiliary unit 56 representative of an electrical alternator which supplies the FADEC with electrical power. The schematically illustrated gearing is simply intended to show that the units 54, 55 are driven by the same turbine and the units can be on a common shaft separately geared or otherwise arranged to achieve that common drive. It is understood that the FADEC is a full authority digital electronic control, and power to that unit is needed in order to control the engine. With respect to the fuel pump 55, it is seen that a conduit 57 connects the fuel pump 55 (via a fuel control) to the combustor section 20b of the engine 20. Thus, when the controller 36 causes the rotation of the auxiliary turbine 32, the fuel pump 55 is driven to supply fuel to the combustor 20b of the engine 20 and the alternator 56 is driven to supply electrical power to the FADEC 58. The units 55, 56 and their associated components are intended to be illustrative of those units essential to starting of the engine, and those skilled in the art will appreciate the nature of any other units which might be included in this group. For example, a further electrical alternator for supplying electrical power to the engine is to be included within the group 60.

The group 61 is intended to illustrate auxiliaries which are non-essential to engine starting, and indeed a group which may be shut down in certain conditions even during operation of the engine. That group can include back-up generators, pumps, etc. It is seen that the auxiliary turbine 30 has its output shaft 50 coupled by gearing illustrated generally at 70 to a single auxiliary unit 71 which is intended to represent a generator or alternator for the aircraft electrical power system.

The intermediate group 62 can be used for other essential elements or non-essential elements, depending upon the desires of the system designer. In the illustrated embodiment, the turbine 31 has its output shaft 51 coupled by means of gearing schematically illustrated at 74 to several auxiliary units 75, 76, 77. The units 75-77 are intended to represent, for example, a lubrication and scavenger pump 75, an engine hydraulic pump 76, and an auxiliary hydraulic pump 77.

While the schematic illustration of FIG. 1 is not intended to represent every auxiliary device associated with a conventional gas turbine engine 20, it is believed that the disclosure is now adequate to provide one skilled in the art with the means for practicing the present invention. In the preferred embodiment, at least one of the groups 60-62 includes auxiliary devices which are essential to the operation of the engine 20, and that group is driven by a turbine 32 which is assured of a supply of driving high pressure gas by way of its controller 36. To the extent certain of the auxiliaries are of the non-essential type, they can be included in the group 61 driven by a turbine 30 which can be shut down (or operated at reduced speed) in appropriate circumstances as the conditions to which the aircraft is subjected change.

In accordance with one aspect of the invention, the group 60 which is essential to starting of the engine, has its controller 36 provided with a supplemental high pressure source of gas for use in starting of the engine. Furthermore, the engine 20 has a starter motor generally indicated at 80 which can be an air turbine starter, for example, provided with high pressure gas from another engine, an auxiliary unit, or a ground based unit. The same high pressure gas supply 81 is coupled via its inlet conduit 26 so that it can be switched by the controller 36 (or valve 42) to the auxiliary turbine 32. A valve 82 is illustrated in its normal operating position, but can be switched to its alternate condition to allow the high pressure gas from supply 81 to pass to the controllers 37-39 to be available for engine starting. The controller 36 is switched to supply the supplemental gas to the associated turbine 32 such that during starting of the engine, when the high pressure gas is provided to the starter motor 80 for turning the engine, high pressure gas is also supplied via controller 36 to the turbine 32 for driving the essential components such as the fuel pump 55 and FADEC alternator 56. The other controllers 34, 35 will be in the off condition so that their auxiliary turbines 30, 31 are not driven. Thus, during starting, the driven elements will all interact and the engine 20 will ultimately be started utilizing normal procedures. After starting of the engine, the system serves to terminate the flow of high pressure gas from the supplemental inlet 81 and instead will provide for high pressure gas via the normal route as tapped from the main engine.

As a further feature of this aspect of the invention, in starting the engine, it is preferred not to run the essential auxiliaries 60 at full speed, and either the controller 36 or the orifice which connects the gas supply to the controller, or the pressure of the inlet gas itself, is adapted to drive the auxiliary turbine 32 at a speed which is less than the normal operating speed, but a speed which is still substantial. In contrast to prior conventional engines in which the auxiliaries might operate in the range of about 8% to 10% of normal operating speed when the engine is fired, the controller 36 is adapted to drive the auxiliary turbine 32 at a much more substantial speed at engine firing, for example, at about 50% of normal rated speed. As a result, the auxiliary units 55, 56 (as well as the other auxiliaries, of course) need not have the operating speed range of auxiliaries normally associated with conventional gas turbine engines. Thus, where the fuel pumps, alternators, lubrication pumps and the like might require a 10:1 speed operating range when used in a conventional engine, the units in accordance with this invention need only 2:1 or 3:1 operating speed range.

This is significant in respect to the size of the units as well as to the manner of dealing with over-capacity when operating at normal cruising speeds and altitudes. In other words, in order for a fuel pump, for example, to supply adequate fuel for starting the engine at normal starting rpm's, the fuel pump must have a flow rate at those low rpm's which results in a flow rate at cruising altitude to be many times more than required. As a result, bypass valves are provided in the fuel line which serve to bypass the major portion of the flow during normal cruising.

In practicing the invention, however, the auxiliary devices such as the fuel pump might have a normal operating speed at cruising which is only twice that at starting, resulting in a much reduced bypass requirement during normal cruising. Similarly, the electrical generator can be substantially reduced in size because the substantial excess capacity can be avoided.

In the preferred practice of the invention, the auxiliaries are divided into at least two groups, with each group driven by a corresponding auxiliary turbine. Among the advantages provided by that configuration are the opportunity to provide, in effect, separate gear ratios (with respect to engine speed) for each of the individual groups of auxiliaries.

It is within the scope of the invention, in at least its broadest aspects, to divide the auxiliaries into two groups, where one group is driven from an auxiliary turbine as described above, and a second group is driven from a mechanical drive coupled to the engine. This configuration provides at least two gear ratios for the respective groups of auxiliaries, one being independent of engine speed, and thus is able to achieve at least some of the benefits of the invention.

Thus, in an alternative embodiment of the invention, at least two groups of auxiliaries are provided, a first group comprising those auxiliaries which are mechanically coupled to the main engine and a second group comprising those auxiliaries which are decoupled from the main engine, i.e., driven by an auxiliary turbine. Therefore, even with only one of the two groups being driven by an auxiliary turbine, the speed ratio of the auxiliary turbine driven group relative to the mechanically driven group is readily alterable. That group can also be decoupled during starting, if the auxiliaries in the group are non-essential to starting. It should also be apparent that the group of auxiliaries which are decoupled from the main engine can be further subdivided into a number of subgroups based on their functions, as described above.

Figure 2:
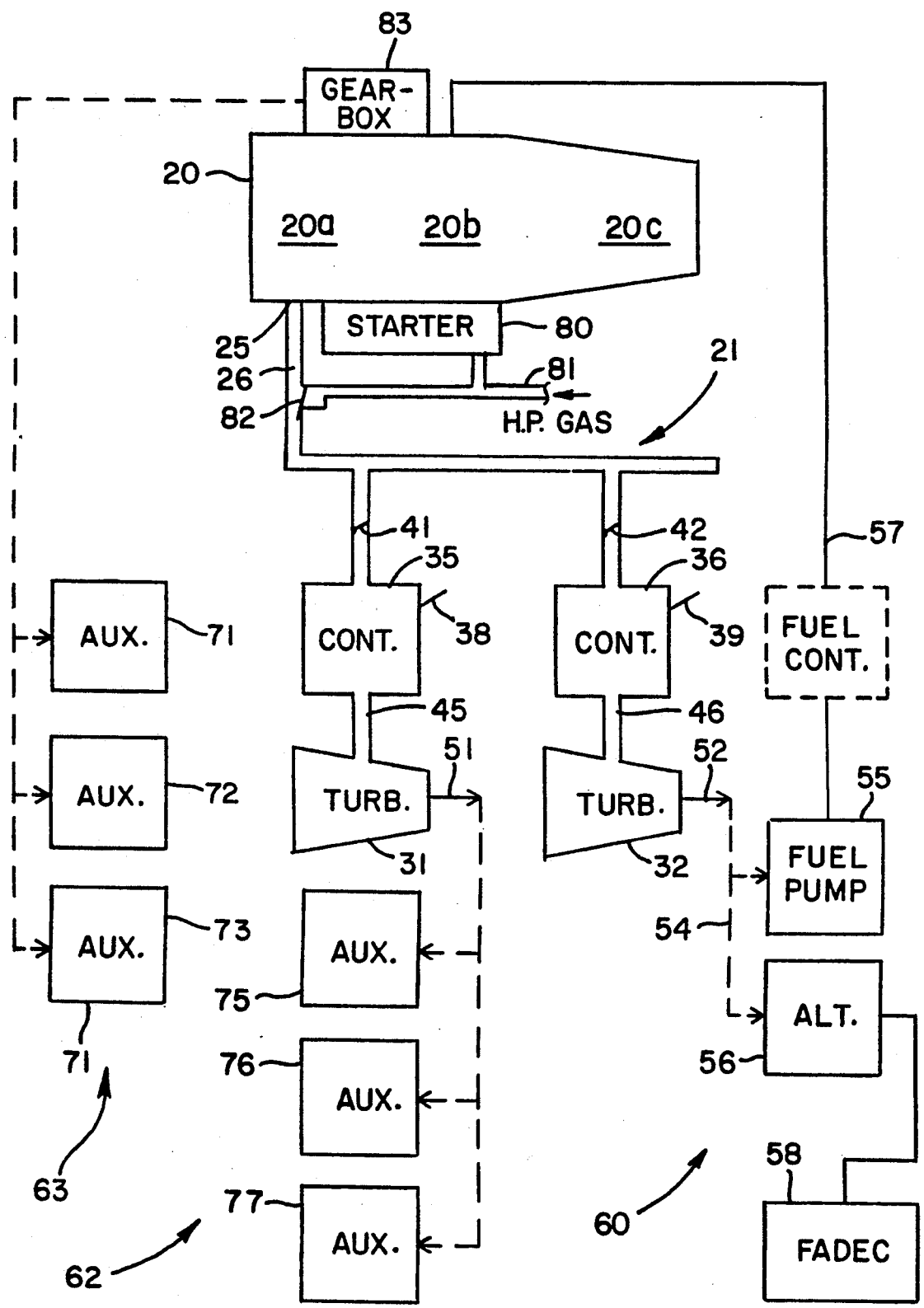
FIG. 2 illustrates an alternative embodiment of the present invention, with some of the auxiliaries geared to the engine and other auxiliaries driven by auxiliary turbines.

Accordingly, FIG. 2 shows a more complex system in which the decoupled auxiliaries are further divided into two subgroups, for a total of three identifiable groups. In FIG. 2, group 63 (comprising auxiliaries 71-73) is shown as being mechanically coupled to main engine 20 through gearbox 83. Thus, group 63 operates in the conventional manner, that is, dependent on the speed of the engine. The ability to directly gear some of the auxiliaries to the main engine allows for added design flexibility, for example when some conventional mechanical coupling is deemed desirable.

However, in accordance with the invention, FIG. 2 further provides that groups 62, 60 are not dependent on the engine speed, being driven by auxiliary turbines 31, 32 respectively. Groups 62, 60 are therefore decoupled from the main engine 20 and, in effect, also decoupled from group 63. As described above, the speed of the auxiliaries within groups 62, 60 can be regulated by controllers 35, 36 to meet a variety of operating conditions.

As shown in FIG. 2, group 60 has been selected to comprise those auxiliaries that are essential to the starting of the engine, while group 62 are those which are non-essential, but nevertheless capable of independent control. As described above, this allows at least some of the non-essential elements to be shut down during the starting of the engine, while allowing essential auxiliaries such as the fuel pump 55 and the alternator 56 to remain operational. Even though mechanically driven auxiliaries 71-73 still place greater starting requirements on the engine than is necessary, it should be apparent that decoupling at least auxiliaries 75-77 reduces the power requirements for engine starting. Additionally, regardless of whether or not power requirements are reduced during starting of the engine, having auxiliaries operate in a controlled manner independent of the engine speed allows for reduced size and smaller operating speed ranges for those auxiliaries. As a result, even if only a single auxiliary turbine was used, benefits could also be obtained with this embodiment.

In the configuration of FIG. 2, the auxiliaries which comprise group 63 can be of either the essential or the non-essential variety. Configuring the engine drive group 63 with non-essential auxiliaries allows the essential auxiliaries to be driven from a high speed auxiliary turbine, such that the essential, turbine driven auxiliaries can be driven at higher speed during starting, with the resulting efficiencies described above. In an alternative arrangement, the auxiliaries which comprise group 63 can be configured as essential auxiliaries, leaving the remaining groups 60, 62 as comprising non-essential auxiliaries. In that configuration, it is possible to shut down both of the non-essential groups. Configuring the system in that manner requires a greater operating speed range for the essential auxiliaries, but decouples non-essential elements to the greatest extent possible for reducing the load on the engine during starting. Thus, regardless of which configuration is chosen, whenever auxiliaries are decoupled from the main engine, benefits are obtained.

Finally, note should be made of the reliability of the system. One of the advantages of the standard mechanical configuration is that once the unit was in place and functional, it was highly reliable. In accordance with the invention, the auxiliary turbine can be configured for high reliability, and the control units which operate those turbines can be simple and highly reliable regulator valves. The minimum number of components in the system fed from the high pressure engine compressor tends to suggest that there are few components to fail, those components can be reliable, well designed elements long used in this environment, and thus the system according to the invention can be configured to be as reliable as the old mechanical drive type.

Thus, it will be apparent that what has been provided is an auxiliary drive for a gas turbine engine for aircraft use, where the drive has much more flexibility than has been provided heretofore, but which is at least as reliable as units utilized in the past. The flexibility allows for the auxiliaries to be driven at different speeds, when that is required, and for some of the auxiliaries to be shut down while others can be operated. Indeed, during starting, only the group of auxiliaries which are necessary for starting the engine need be driven, and the others can remain quiescent until the engine accelerates to operating speed, following which the additional auxiliaries can be switched on in a logical fashion. The manner in which the auxiliaries are grouped to be driven by different turbines can also be configured to provide redundant units in alternate branches, to be switched into the system upon failure of a primary, even further increasing reliability.

What is claimed is:

1. A drive system for auxiliaries associated with a main gas turbine engine, the drive system comprising, in combination:
    a first and a second group of auxiliaries, wherein the first group includes essential auxiliaries which must be operated in order to start the main engine and the second group includes non-essential auxiliaries;
    at least two auxiliary turbines;
    independent means coupling the intakes of each of the auxiliary turbines to a high pressure takeoff of the main engine;
    means mechanically coupling the auxiliary turbines to the respective groups of auxiliaries so that each group of auxiliaries is driven by an associated auxiliary turbine, a first one of said auxiliary turbines being coupled for driving said first group of auxiliaries;
    means independently controlling the auxiliary turbines to independently control the speed of rotation of the respective groups of auxiliaries; and
    means driving the first auxiliary turbine to operate the essential auxiliaries during starting of the main engine.

2. The drive system as set forth in claim 1 wherein the main engine is used to power an aircraft, and the means driving the first auxiliary turbine includes means providing a secondary high pressure gas supply to the first auxiliary turbine during starting of the main engine.

3. The drive system of claim 2 wherein a second one of the auxiliary turbines is coupled to non-essential auxiliaries, said means independently controlling being operative to disable said second auxiliary turbine during starting of the main engine.

4. The drive system as set forth in claim 1 wherein the means independently controlling comprises means for driving the auxiliary turbines at different speeds, thereby to allow independent control of the speed of rotation of the respective groups of auxiliaries.

5. The drive system as set forth in claim 4 in which the means independently controlling includes means for independently shutting down the respective auxiliary turbines so that the groups of auxiliaries can be individually driven.

6. The drive system as set forth in claim 1 in which the means driving the first auxiliary turbine during starting of the main engine includes means for driving the essential auxiliaries at at least about half normal operating speed during starting of the main engine.

7. The drive system as set forth in claim 2 in which the means driving the first auxiliary turbine during starting of the main engine includes means for driving the first auxiliary turbine at at least about half normal operating speed during starting of the main engine.

8. The drive system as set forth in claim 2 wherein the essential auxiliaries include a fuel pump for supplying fuel to the main engine.

9. The drive system as set forth in claim 8 wherein the essential auxiliaries further include an electrical alternator for supplying electrical power to a FADEC.

10. The drive system as set forth in claim 1 wherein at least some of the auxiliaries are located substantially remotely from other auxiliaries and from the engine such that at least the remotely located auxiliaries are not mounted on the engine.

11. The drive system as set forth in claim 1 wherein the high pressure takeoff is coupled to the compressor section of the main engine.

12. A method of driving auxiliary devices associated with a main gas turbine engine, the method comprising the steps of:
    dividing the auxiliaries into at least two groups including a first group comprising essential auxiliaries which must be operated in order to start the main engine and a second group comprising non-essential auxiliaries, mechanically coupling the auxiliaries within each group together for driving by respective prime movers;
    providing a number of auxiliary turbines equal to the number of groups of auxiliaries to serve as the prime movers for the respective groups including a first auxiliary turbine coupled to the first group of auxiliaries;
    diverting high pressure gas from the main engine to the inlets of the respective auxiliary turbines for driving thereof;
    providing independent controls for the respective auxiliary turbines for independently adjusting the on or off status and speed of the respective turbines;
    independently adjusting the operating speeds of the respective auxiliary turbines to accommodate a plurality of operating conditions encountered by the main engine; and driving the first auxiliary turbine to operate the essential auxiliaries during starting of the main engine.

13. The method as set forth in claim 12 in which the main engine powers an aircraft, the method further comprising the step of controlling a second auxiliary turbine connected to the non-essential auxiliaries to be non-driven during starting of the main engine.

14. The method as set forth in claim 13 wherein the step of controlling the first auxiliary turbine during starting includes driving said auxiliary turbine at at least about half normal operating speed during starting of the main engine.

15. The method as set forth in claim 14 wherein the method further comprises the step of controlling the speed of the second auxiliary turbine to drive said second auxiliary turbine at an operating speed different from the main engine as desired.

16. The method as set forth in claim 12 wherein the step of independently adjusting the operating speeds includes the step of driving the first turbine to operate at a first speed and the second turbine to operate at a second speed that is different from the first speed during normal operation.

17. The method as set forth in claim 16 wherein the method includes the step of altering the rotational speed of one of said auxiliary turbines while leaving other auxiliary turbines at different speeds relative to the altered auxiliary turbine, whereby the rotational speed of one group of auxiliaries can be altered without altering the rotational speed of other groups.

18. The method as set forth in claim 12 wherein the step of diverting high pressure gas comprises tapping high pressure gas from the compressor section of the main engine.

19. A drive system for auxiliaries associated with a main gas turbine engine, comprising, in combination:
a first and a second group of auxiliaries, wherein the first group includes non-essential auxiliaries and the second group includes essential auxiliaries which must be operated in order to start the main engine;
mechanical drive means driven from the main engine and coupled to the first group of auxiliaries for driving the first group at a speed related to the speed of the main engine;
at least one auxiliary turbine;
means coupling the intake of the auxiliary turbine to a high pressure takeoff of the main engine for driving the auxiliary turbine;
means mechanically coupling the auxiliary turbine to the second group of auxiliaries so that the second group of auxiliaries is driven by the auxiliary turbine;
means controlling the auxiliary turbine to independently control the speed of rotation of the second group of auxiliaries independent of the engine speed, so that the ratio of the speed of the second group relative to the first group can be controlled; and
means driving the auxiliary turbine to operate the essential auxiliaries during starting of the main engine.

20. The drive system as set forth in claim 19 further including a second auxiliary turbine, means mechanically coupling the second auxiliary turbine to a further group of auxiliaries, and further means controlling the second auxiliary turbine to independently control the speed of rotation of the further group of auxiliaries independent of the engine speed, so that the ratio of the speed of the further group relative to the first and second group can be controlled.

21. The drive system as set forth in claim 19 wherein the main engine is used to power an aircraft, and the means controlling is operative to control the auxiliary turbine to drive the second group of auxiliaries at at least about half normal operating speed during starting of the main engine.

22. A method of driving auxiliary devices associated with a main gas turbine engine, the method comprising the steps of:
dividing the auxiliaries into a first group for mechanical drive from the main engine and a second group for drive from an auxiliary prime mover wherein the second group includes essential auxiliaries which must be operated in order to start the main engine;
mechanically driving the first group of auxiliaries from a main engine power takeoff to drive the auxiliaries of the first group at a speed which is fixed with respect to engine speed;
providing an auxiliary turbine to serve as the auxiliary prime mover for the second group;
diverting gas from the main engine to the inlet of the auxiliary turbine for driving thereof;
providing an independent control for the auxiliary turbine for independently adjusting the on or off status and speed of the turbine;
independently adjusting the operating speed of the auxiliary turbine to accommodate a plurality of operating conditions encountered by the main engine; and
driving the auxiliary turbine to operate the essential auxiliaries during starting of the main engine.

23. The method as set forth in claim 22 in which the dividing step includes providing a third group of auxiliaries for drive from an additional auxiliary prime mover, the method further comprising the steps of:
providing an additional auxiliary turbine to serve as the additional prime mover;
diverting gas from the main engine to the inlet of the additional auxiliary turbine for driving thereof;
providing an additional independent control for the additional auxiliary turbine for independently adjusting the on or off status and speed of the last-mentioned turbine; and
independently adjusting the operating speed of the additional auxiliary turbine to accommodate the plurality of operating conditions encountered by the main engine.

24. The method as set forth in claim 22 in which the main engine powers an aircraft, and the step of driving the auxiliary turbine during starting includes driving the auxiliary turbine at at least about half normal operating speed during starting of the main engine.

25. A drive system for auxiliaries associated with a main gas turbine engine, the drive system comprising, in combination:
a first and a second group of auxiliaries, wherein the first group includes essential auxiliaries which must be operated in order to start the main engine and the second group includes non-essential auxiliaries;
at least two independent drive means for driving the respective groups of auxiliaries, the drive means including at least one auxiliary turbine;
means coupling the intake of the auxiliary turbine to a high pressure takeoff of the main engine;

the auxiliary turbine of the drive means being mechanically coupled to the first group of auxiliaries;
a second of the two independent drive means being coupled to the second group of auxiliaries for drive thereof;
means independently controlling the auxiliary turbine to independently control the speed of rotation of the first group of auxiliaries, so that the ratio of the speed of the first group relative to the second group can be controlled; and
means driving the auxiliary turbine to operate the essential auxiliaries during starting of the main engine.

* * * * *